(12) United States Patent
Fäcke et al.

(10) Patent No.: US 11,000,976 B2
(45) Date of Patent: May 11, 2021

(54) METHOD FOR PRODUCING AN OPTICAL CAST BODY HAVING A HOLOGRAPHIC OPTICAL ELEMENT, AND OPTICAL CAST BODY

(71) Applicant: Covestro Deutschland AG, Leverkusen (DE)

(72) Inventors: Thomas Fäcke, Leverkusen (DE);
Robert Maleika, Düsseldorf (DE);
Enrico Orselli, Cologne (DE);
Frank-Stefan Stern, Bergisch Gladback (DE)

(73) Assignee: Covestro Deutschland AG, Leverkusen (DE)

( * ) Notice: Subject to any disclaimer, the term of this patent is extended or adjusted under 35 U.S.C. 154(b) by 525 days.

(21) Appl. No.: 15/543,124

(22) PCT Filed: Jan. 13, 2016

(86) PCT No.: PCT/EP2016/050539
§ 371 (c)(1),
(2) Date: Jul. 12, 2017

(87) PCT Pub. No.: WO2016/113288
PCT Pub. Date: Jul. 21, 2016

(65) Prior Publication Data
US 2017/0368723 A1    Dec. 28, 2017

(30) Foreign Application Priority Data

Jan. 14, 2015  (EP) ..................................... 15151178

(51) Int. Cl.
*B29C 39/24*    (2006.01)
*B29D 11/00*    (2006.01)
(Continued)

(52) U.S. Cl.
CPC .............. *B29C 39/24* (2013.01); *B29C 39/36* (2013.01); *B29C 39/38* (2013.01);
(Continued)

(58) Field of Classification Search
None
See application file for complete search history.

(56) References Cited

U.S. PATENT DOCUMENTS

| | | |
|---|---|---|
| 4,994,347 A | 2/1991 | Smothers |
| 6,241,922 B1 | 6/2001 | Bishop et al. |

(Continued)

FOREIGN PATENT DOCUMENTS

| | | |
|---|---|---|
| CN | 101490601 A | 7/2009 |
| CN | 102870157 A | 1/2013 |

(Continued)

OTHER PUBLICATIONS

International Search Report for PCT/EP2016/050539 dated Mar. 30, 2016.

(Continued)

*Primary Examiner* — Jacob T Minskey
(74) *Attorney, Agent, or Firm* — Faegre Drinker Biddle & Reath LLP

(57) ABSTRACT

The invention relates to a process for producing an optical casting comprising at least one volume-holographic optical element by means of at least one casting operation, the process comprising the following steps:
  providing a casting mould comprising a first mould section having a flat, spherical, aspherical or free-form first surface and a second mould section having a flat, spherical, aspherical or free-form second surface, the first mould section being connectable to the second mould section to form the casting mould,
  providing at least one holographic optical element,
(Continued)

Figure 3:
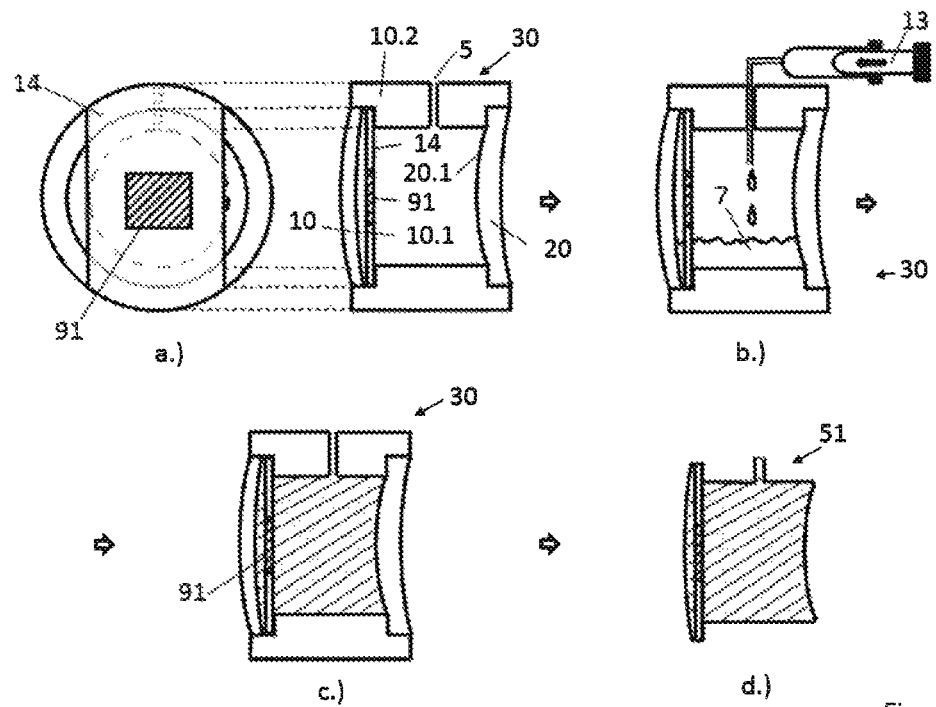

positioning and aligning the at least one holographic optical element with respect to the first mould section or/and with respect to the second mould section, combining the first and second mould sections to form the casting mould, introducing casting material in one or more casting steps, the casting material having a maximum viscosity at 25° C. of 100 000 mPas, curing the casting material, removing the cured casting material comprising the at least one holographic optical element from the casting mould, the at least one holographic optical element being at least partly surrounded by the casting material.

13 Claims, 6 Drawing Sheets

(51) Int. Cl.
  *B29C 39/36* (2006.01)
  *B29C 39/38* (2006.01)
  *G03H 1/02* (2006.01)
  *B29K 75/00* (2006.01)
  *B29L 11/00* (2006.01)

(52) U.S. Cl.
  CPC .... *B29D 11/0074* (2013.01); *B29D 11/00528* (2013.01); *B29D 11/00807* (2013.01); *G03H 1/0248* (2013.01); *B29K 2075/00* (2013.01); *B29L 2011/0016* (2013.01); *G03H 2001/0264* (2013.01)

(56) References Cited

U.S. PATENT DOCUMENTS

| | | | |
|---|---|---|---|
| 7,826,113 | B2 | 11/2010 | Noda |
| 9,146,456 | B2 | 9/2015 | Berneth et al. |
| 2002/0036751 | A1 | 3/2002 | Tanijiri et al. |
| 2004/0141684 | A1* | 7/2004 | Wildnauer ......... G02B 6/29307 385/24 |
| 2008/0027198 | A1 | 1/2008 | Naruse et al. |
| 2008/0036964 | A1 | 2/2008 | Miura et al. |
| 2010/0113247 | A1* | 5/2010 | Ikenishi ................. C03B 11/12 501/44 |
| 2010/0141890 | A1 | 6/2010 | Menta et al. |
| 2011/0045306 | A1* | 2/2011 | Johnson ................. B29C 43/28 428/423.1 |
| 2012/0032070 | A1* | 2/2012 | Otaki ................... G03H 1/0011 250/271 |
| 2012/0214089 | A1 | 8/2012 | Hönel et al. |
| 2014/0293217 | A1 | 10/2014 | Ogaya et al. |
| 2016/0252808 | A1 | 9/2016 | Berneth et al. |
| 2017/0312739 | A1 | 11/2017 | Yeo et al. |

FOREIGN PATENT DOCUMENTS

| | | |
|---|---|---|
| CN | 103930808 A | 7/2014 |
| EP | 0223587 A1 | 5/1987 |
| EP | 2051129 A1 | 4/2009 |
| EP | 2626185 A1 | 8/2013 |
| EP | 13189138.4 | 10/2013 |
| EP | 2796907 A1 | 10/2014 |
| JP | 62-010603 A | 1/1987 |
| JP | 62-233234 A | 10/1987 |
| JP | H10151643 A | 6/1998 |
| JP | 2001004820 A | 1/2001 |
| JP | 2001-242308 A | 9/2001 |
| JP | 2002-156600 A | 5/2002 |
| JP | 2008168646 A | 7/2008 |
| JP | 2008170852 A | 7/2008 |
| JP | 2010125803 A | 6/2010 |
| JP | 2013-510336 A | 3/2013 |
| JP | 2017-536973 A | 12/2017 |
| KR | 10-2009-0038483 A | 4/2009 |
| KR | 10-2012-0101642 A | 9/2012 |
| TW | 201132662 A | 10/2011 |
| WO | 2008/018168 A1 | 2/2008 |
| WO | 2011/067057 A1 | 6/2011 |
| WO | WO-2012062655 A2 | 5/2012 |
| WO | 2014/021466 A1 | 2/2014 |
| WO | WO-2015055576 A1 | 4/2015 |

OTHER PUBLICATIONS

Written Opinion of the International Searching Authority for PCT/EP2016/050539 dated Mar. 30, 2016.

International Preliminary Report on Patentability received for PCT Patent Application No. PCT/EP2016/050539, dated Jul. 27, 2017, 16 pages (10 pages of English Translation and 6 pages of Original Document).

\* cited by examiner

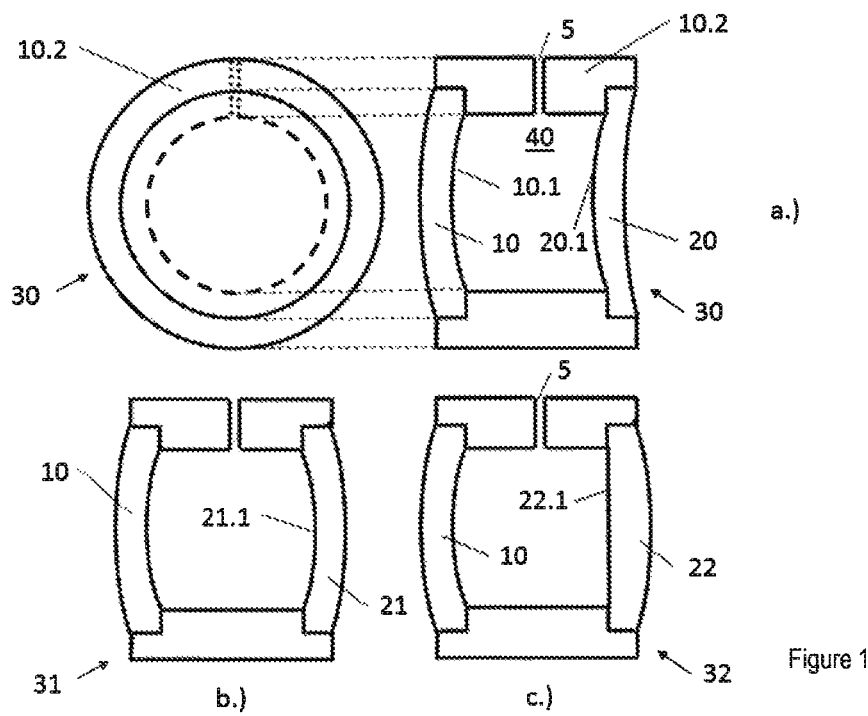
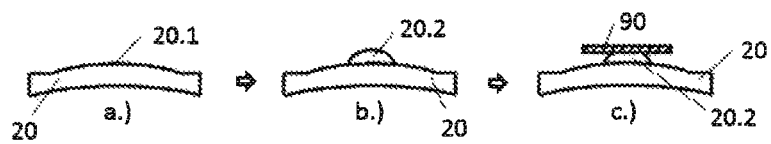
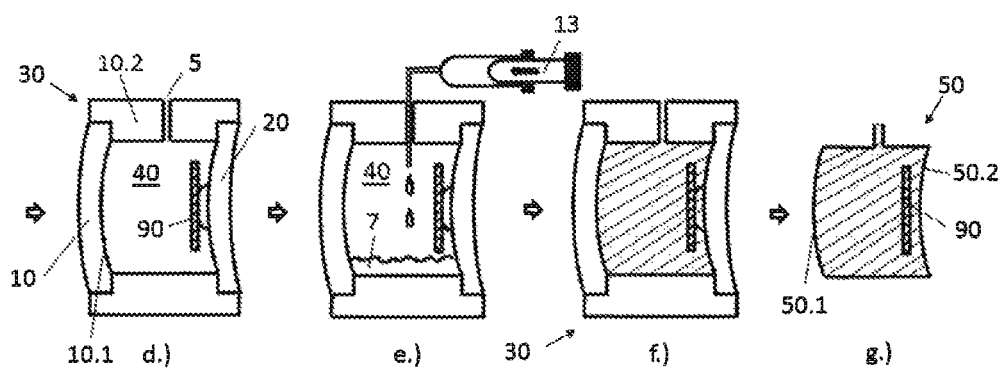
Figure 1
Figure 2

METHOD FOR PRODUCING AN OPTICAL CAST BODY HAVING A HOLOGRAPHIC OPTICAL ELEMENT, AND OPTICAL CAST BODY

CROSS-REFERENCE TO RELATED APPLICATIONS

This application is a national stage application (under 35 U.S.C. § 371 ) of PCT/EP2016/050539, filed Jan. 13, 2016, which claims benefit of European Application No. 15151178.9, filed Jan. 14, 2015, both of which are incorporated herein by reference in their entirety.

The invention relates to a process for producing an optical casting comprising at least one volume-holographic optical element by means of at least one casting operation. The invention further relates to an optical casting and to pairs of glasses, optical instruments and devices comprising such an optical casting.

BACKGROUND OF THE INVENTION

In diffractive optics, a distinction is made between diffractive structures which have been embossed on a surface and those present within the corresponding structure. If the latter involves periodically varying layers of different refractive indices, these are referred to as phase holograms. Structures of this kind allow a very elegant manner of alteration of a light wavefront and have various advantages by contrast to diffractive embossed surfaces. For instance, the diffraction efficiency may be very high and the high Bragg selectivity allows effective suppression of unwanted higher orders. In addition, these optics allow a transparent appearance if the Bragg condition (for example at different angles) is not satisfied. It is thus possible to produce optical combiners.

Diffractive optics, just like refractive optics, have chromatic aberrations which have to be minimized. Since shorter-wave light is more strongly refracted than longer-wave light for refractive optics, whereas the exact opposite is the case for diffractive optics, it is possible, for example, by means of hybrid optics consisting of diffractive and refractive components to achieve compact chromatic aberration corrections. Moreover, there are advantages in using such hybrid optics if different optical functions to be achieved independently are required in one optical structure. Anyone wishing to implement this with refractive optics only is forced to correspondingly assign parts of the optical aperture of the system each to one or the other optical function. In hybrid optics, there is greater freedom here, since the optical functions can be realized independently of one another.

Phase holograms are also called (volume-)holographic optical elements (vHOE for short). The optical function is formed via the geometry of the periodically varying layers. This is accomplished via an interference exposure method. Possible optical functions of the holograms correspond to the optical functions of light elements such as lenses, mirrors, deflecting mirrors, filters, diffuser lenses, directed diffusion elements, directed holographic diffusers, diffractive elements, light guides, waveguides, input/extraction elements, projection lenses and/or masks. In addition, a plurality of such optical functions can be combined in such a hologram, for example such that the light is deflected in a different direction according to the incidence of light. Phase holograms can be exposed into a recording material by the interference exposure method. Standard materials for this purpose are photopolymers, silver halide films and dichromate gelatin films.

High-quality refractive optical components are manufactured from transparent materials such as glass and plastic. The former are usually heavy; the latter are lighter and can be manufactured by casting methods and injection moulding methods.

JP2008170852A (Sony) teaches the production of a plastic body comprising a vHOE by means of an injection moulding method with a thermoplastic body. However, this is a security hologram and the optical quality of the structure is inadequate for optical applications.

U.S. Pat. No. 7,826,113B2 (Konica Minolta) teaches the use of lamination methods and the use of adhesive layers for bonding of vHOEs to refractive structures. Methods of this kind require sequential mounting of at least two refractive components, which is difficult, in order to ensure the required optical quality. Moreover, the use of intermediate layers such as adhesives leads to interfaces which can very easily adversely affect the optical quality. In addition, the provision of several individual components and the subsequent assembly is costly.

For use as an optical element for glasses, for optical structures in imaging optics, but also for high-efficiency light and image projections in which a vHOE is to be used, corresponding optical elements of sufficiently high quality are required.

Moreover, it is of great importance that the optical function of the refractive component of such an optical article having hybrid function and the diffractive component (vHOE) are aligned optically with respect to one another.

It is therefore an object of the present invention to provide a process for precisely positioning a volume-holographic optical element in a transparent, high-quality casting. It is a further object of the invention to provide an optical casting having at least one holographic optical element, where the optical casting is to feature a high optical quality.

BRIEF SUMMARY OF THE INVENTION

The object is achieved by a process for producing an optical casting by means of at least one casting operation, comprising at least one holographic optical element, wherein the process comprises the following steps:
 providing a casting mould comprising a first mould section having a flat, spherical, aspherical or free-form first surface and a second mould section having a flat, spherical, aspherical or free-form second surface, the first mould section being connectable to the second mould section to form the casting mould,
 providing at least one holographic optical element,
 positioning and aligning the at least one holographic optical element with respect to the first mould section or/and with respect to the second mould section,
 combining the first and second mould sections to form the casting mould,
 introducing casting material in one or more steps, the casting material having a maximum viscosity at 25° C. of 100 000 mPas,
 curing the casting material,
 removing the cured casting material comprising the at least one holographic optical elements from the casting mould, the at least one holographic optical element being at least partly surrounded by the casting material.

The process according to the invention can produce optical castings of high optical quality in a comparatively simple manner.

DETAILED DESCRIPTION OF THE INVENTION

At the start of the process, a casting mould is provided, comprising a first mould section having a flat, spherical, aspherical or free-form first surface and a second mould section having a flat, spherical, aspherical or free-form second surface. To form a casting mould, the first mould section can be connected to the second mould section. In addition, at least one holographic optical element is provided, which is integrated into the optical casting to be produced.

The sequence of the individual process steps for production of the optical casting after provision of the mould sections and the at least one holographic optical element is not strictly defined. For example, the at least one holographic optical element may first be positioned and aligned with respect to the first mould section or/and with respect to the second mould section and this is followed by the combining of the first and second mould sections to form the casting mould, and then the casting material is introduced into the casting mould and cured.

According to the invention, it is likewise possible first to combine the mould sections to form the casting mould and then to position and align the at least one holographic optical element in the casting mould with respect to the first mould section or/and with respect to the second mould section. For this purpose, the at least one holographic optical element can be introduced into the casting mould, for example, by means of a suitable, especially slot-shaped, orifice.

A further variant of the process according to the invention involves first introducing a portion of the casting material into the first and/or second mould section in a first casting step, allowing the casting material to at least partly cure and then positioning and aligning the at least one holographic optical element on the surface that forms. This is followed by the combining of the first and second mould sections to form the casting mould and, in a further step, by the introduction of the rest of the casting material with subsequent complete curing thereof.

According to the invention, the components of the casting mould comprise a first mould section having a first surface and a second mould section having a second surface. The mould sections may be manufactured, for example, from glass, glasses here meaning those which are produced from typically boron oxides, silicon oxides, aluminium oxide, sodium oxide and calcium oxide and mixtures thereof as main components. Further ingredients may be oxides of iron, zirconium, titanium, lead, barium, copper, silver, potassium and magnesium. Small amounts of bromides, chlorides and fluorides are likewise usable. Preference is given to borosilicate and quartz glass.

It is advantageous to use glasses which are tempered before use, such that stress cracks do not arise. In a further preferred embodiment, glasses having similar coefficients of thermal expansion to those of the casting material are used. It is also possible to use glasses having a low coefficient of expansion, for example glass-ceramic materials.

Especially for (partly) automated processes, the mould sections may also be manufactured from metals, since these have higher robustness.

According to the desired shape of the optical casting to be produced, various shapes may be used. For instance, it is possible to use flat surfaces, or else spherical or aspherical surfaces, and also free-form surfaces. In each case, it is possible to use convex or concave surfaces. The surfaces may additionally also have prismatic or cylindrical geometries. A combination of these geometries is likewise possible. The radii may be varied, these typically being reported in terms of their refractive power in dioptres for applications in pairs of glasses. In this case, it is possible to use skilful combinations of a convex surface and a concave surface, so as to give rise to an aesthetically shaped optical article as suitable, by virtue of its refractive form, for correcting ametropia such as myopia, hyperopia or astigmatism. Other different surface shapes may likewise be used. It is also advantageous to take account of shapes suitable for spectacle glasses which, for example, are aligned closely and/or in an aesthetic manner to the shape of the head. What are desired for optical elements in industrial optics are comparatively compact structural geometries, which can likewise be implemented via the suitable shaping of the surfaces.

The surfaces are finished by processes customary in industry, so as to give rise to a high-precision optical form. Customary processes are machining, grinding and polishing processes, and the application of antireflection and/or scratch-resistant layers. The surfaces are generally thus highly polished.

The two mould sections can be connected, so as to give a casting mould having a casting cavity or an internal casting volume. For this purpose, the first and/or second mould section may further comprise a sleeve for connection of one mould section to the other mould section. Typically, the sleeve is manufactured from plastic, in order to enable rapid assembly. For this purpose, it is possible to use polyvinyl chloride, polyolefins such as polypropylene, polyethylene or else polycycloolefins. It is likewise possible to use rubbers, for example butyl rubber or EPDM, especially in vulcanized form. It is also possible to use thermoplastic and crosslinked elastomeric polyurethanes, silicones and epoxy resins.

In terms of its geometry, the sleeve is such that the two mould sections can be sealed tightly to one another. Specific clips and folds are especially suitable for an arrangement that closes flush.

According to the invention, the at least one holographic optical element is positioned and aligned with respect to the first mould section and/or with respect to the second mould section. Specifically, it is possible here for the at least one holographic optical element to be positioned and aligned with respect to the first surface of the first mould section or with respect to the second surface of the second mould section or with respect to the sleeve. In the case of positioning and alignment of the at least one holographic optical element with respect to the sleeve, the at least one holographic optical element can be positioned and aligned there before or after integration of the sleeve into the respective mould section. It is likewise possible that the positioning and alignment are effected with respect to the first surface of the first mould section and with respect to the second surface of the second mould section. In addition, the positioning and alignment can be effected with respect to the surface of one mould section and simultaneously with respect to the sleeve of the same mould section, or else with respect to the first surface of the first mould section, with respect to the second surface of the second mould section and with respect to the sleeve of the first and/or second mould section.

The positioning can be effected in various ways with respect to a mould section having a sleeve. For instance, it is possible with the casting mould closed to insert the holographic optical element through an orifice in the sleeve, such that the positioning and alignment are effected by the orifice geometry itself. In this case, the position of the orifice is crucial to the positioning; the geometry defines the alignment. It may be advantageous when the sleeve has a minimal thickness, in order that the holographic optical element can be positioned precisely. For instance, it is advantageous to choose the thickness of the sleeve to be greater than 0.5 mm, advantageously greater than 3 mm and particularly advantageously greater than 10 mm.

The orifice may be within the sleeve or else at the interface to the first mould section. It is also possible to fix the holographic optical element with respect to the mould section with the aid of the sleeve.

It is additionally possible that the positioning is effected with respect to the surface of one of the mould sections. Advantageously, the positioning and alignment can be effected by means of a film which has been laminated, applied or drawn down onto the first surface of the first mould section or onto the second surface of the second mould section beforehand. The film can also be applied by means of a tool which, by means of (air) pressure, causes the film to adhere to the surface. The film can also be positioned onto the surface by means of a thermoforming method. In the thermoforming method, the film is heated and made slightly deformable by means of an oven (for example a convection oven) or a radiation source (IR, UV, VIS). By virtue of the heating, the film is softened particularly easily and quickly and is then applied to the surface with (air) pressure. Additionally usable is a high-pressure forming method, with the aid of which the film, after heating to slightly below its softening temperature, is positioned on the surface by the application of particularly high pressure. It is particularly advantageous to use the convex side of the first surfaces for the application of the film.

The film may fully or only partly cover the first or second surface. In addition, the film may be of the same size as the holographic optical element, or else may be larger or smaller. It is particularly advantageous when the film completely covers the surface of the corresponding mould section and, more particularly, this surface is of convex shape. It is also particularly advantageous when the film completely covers the surface of the corresponding mould section.

The film used, in a further advantageous configuration of the invention, consists essentially of the same casting material. This has the advantage that any visible interface between film and casting material disappears. "Essentially of the same casting material" means materials containing the same chemical constituents as the casting material. Cured casting materials exhibit a high modulus, and for that reason it may be advantageous not to conduct the curing of the casting material in the film to completion, in order to still make forming to the surface possible. For one-pack materials, this is possible, for example, by means of a controlled conversion to a conversion level of 30%-95%, particularly advantageously of 50%-90%. (Conversion level in the context of the present invention always means the percentage conversion level of the reactive chemical groups, determinable by spectroscopic methods. Suitable methods for determining the conversion level are, for example, infrared, Raman and nuclear resonance spectroscopy.) For thermally curing one-pack systems, it is possible, for example, to reduce the amount of catalyst, the curing time of the film or the amount of initiator. In the case of radiation-curing one-pack systems, the amount of photoinitiator or the light dose can be reduced. Thermally curing one-pack systems may contain, for example, free-radically polymerizable monomers which are polymerized with the aid of thermally decomposing free-radical formers such as peroxides (e.g. dialkyl peroxides or hydroxyalkyl peroxides or chemically related peroxides) or diazo compounds (for example diazaisobutyronitrile "AIBN"). In the case of radiation-curing systems, it is likewise possible to use free-radically polymerizable monomers which are polymerized with UV initiators (e.g. alpha-hydroxy ketones) and UV light. Suitable free-radically polymerizing monomers are acryloyl-functional monomers. It is also possible to use monomers which polymerize by means of the thiol-ene reaction. Aliphatic thiols are used here and these are reacted with acrylates, vinylsilanes or other Michael acceptors. For two-pack casting systems, it is possible not just to reduce a) amounts of catalyst and b) amounts of initiator and c) to reduce the curing time; in addition, it is also possible d) to slightly modify the mixing ratio or to conduct two or more of these measures simultaneously. In doing so, it is possible to build up only a reduced crosslinking density, such that this enables forming of the film. In the case of two-pack systems based on poly- or diisocyanates and alcohols/thiols (i.e. what are called polyurethane systems or thiopolyurethane systems), the isocyanates can be used in excess. Then there is a later reaction with ambient water to give the urea. It is also possible to work in the same way in a deficiency of isocyanate, in which case isocyanate migrates out of the casting material into the film and enables postcrosslinking.

The holographic optical element can also be positioned on the surface of a mould section with a material droplet which functions as fixing agent, the refractive index of the material droplet differing from that of the casting material by not more than 0.01, preferably 0.002. In this case, it is also particularly advantageous when the material droplet consists essentially of the same material as the casting material itself. This is possible especially when a material having only a conversion level of 30%-90%, advantageously 50%-90%, is used. Analogous considerations apply here to those in the case of a film for positioning and alignment of the holographic optical element. The systems usable in chemical terms are also the same as in the case of a film as positioning material (see above).

The positioning can also be implemented through the use of a film which introduces a further function into the optical article. For instance, it is possible to introduce polarizer films, colour films, design films, UV protection films, photochromic films. In these cases, it is possible to laminate or bond the holographic optical element onto this film and then to position and align it with respect to the first mould section and/or with respect to the second mould section.

The positioning can likewise be effected in a two-step or multistep process by first filling a portion of the casting mould with casting material, this being partly cured or fully cured. Subsequently, the holographic optical element is positioned onto the resulting surface. In the subsequent step, the remaining free volume of the casting mould is filled again and the casting material is cured. It is advantageous when the resultant surface is essentially at right angles to the optical axis of the optical article, such that the holographic optical element is then likewise at right angles thereto. It is particularly advantageous when the partial filling is effected on a concave surface.

In a modification of the above configuration, the first and/or second mould section may first at least be partly filled with casting material and the casting material may then be at least partly cured, and then the at least one holographic optical element is positioned and aligned on the formed surface of the at least partly cured casting material, and then the first and second mould sections are combined to form the casting mould, then the casting mould is completely filled with casting material and the entire casting material is subsequently cured.

The positioned and aligned holographic optical elements, as a result of their intrinsic optical function, have an optical relationship with the optical function of the optical casting produced.

In a preferred embodiment, the optical casting has an optical axis which, in the case of spectacle glass, is aligned to the user's eye. The alignment of the holographic optical element, preferably of a planar holographic optical element, can thus be reported as an angle to the optical axis of the optical casting. The angle between the normal vector of the plane of the planar holographic optical element and the optical axis of the casting may be 0° to 90°, preferably 0° to 60°.

A holographic optical element always has two intrinsic optical preferential alignments which are defined, on exposure, by the angles of incidence of the reference and object beams relative to the (preferably planar) surface of the recording material. These two optical preferential directions can be chosen freely from the normal vector to the plane of the planar optical element. In a particularly preferred embodiment, one of these two preferential directions (i.e. either of the object beam or of the reference beam) is aligned collinear to the optical axis of the optical casting.

The holographic optical element itself consists of a holographic recording layer and optionally adjoining thermoplastic substrates. Usable thermoplastic substrates consist of polyethylene terephthalate and other polyesters, polycarbonate, amorphous polyamides, cellulose triacetate, polymethylmethacrylate, polyurethanes, polycycloolefins (COCs), polystyrene and polyethylene or polypropylene.

It is also possible, rather than a thermoplastic substrate, to use thermoset substrates. In that case, a particular option is to use essentially the same materials as for the casting material used.

Suitable holographic recording materials are silver halide emulsions and dichromate gelatins. More particularly, photopolymers are also suitable. Preference is given to those photopolymers which comprise binder, writing monomers and a photoinitiator system.

Binders used may be amorphous thermoplastics, for example polyacrylates, polymethylmethacrylates or copolymers of methyl methacrylate, methacrylic acid or other alkyl acrylates and alkyl methacrylates, and also acrylic acid, for example polybutyl acrylate, and also polyvinyl acetate and polyvinyl butyrate, the partially hydrolysed derivatives thereof, such as polyvinyl alcohols, and copolymers with ethylenes and/or further (meth)acrylates, gelatins, cellulose esters and cellulose ethers such as methyl cellulose, cellulose acetobutyrate, silicones, for example polydimethylsilicone, polyurethanes, polybutadienes and polyisoprenes, and also polyethylene oxides, epoxy resins, especially aliphatic epoxy resins, polyamides, polycarbonates and the systems cited in U.S. Pat. No. 4,994,347A and therein.

The binders may be particularly in a crosslinked state and more preferably in a three-dimensionally crosslinked state.

The binders more preferably comprise or consist of polyurethanes and most preferably comprise or consist of three-dimensionally crosslinked polyurethanes.

Such crosslinked-polyurethane binders are obtainable for example by reaction of at least one polyisocyanate component a) with at least one isocyanate-reactive component b).

The polyisocyanate component a) comprises at least one organic compound having at least two NCO groups. These organic compounds may especially be monomeric di- and triisocyanates, polyisocyanates and/or NCO-functional prepolymers. The polyisocyanate component a) may also contain or consist of mixtures of monomeric di- and triisocyanates, polyisocyanates and/or NCO-functional prepolymers.

Monomeric di- and triisocyanates used may be any of the compounds that are well known per se to those skilled in the art, or mixtures thereof. These compounds may have aromatic, araliphatic, aliphatic or cycloaliphatic structures. The monomeric di- and triisocyanates may also comprise minor amounts of monoisocyanates, i.e. organic compounds having one NCO group.

Suitable polyisocyanates are compounds which have urethane, urea, carbodiimide, acylurea, amide, isocyanurate, allophanate, biuret, oxadiazinetrione, uretdione and/or iminooxadiazinedione structures and are obtainable from the aforementioned di- or triisocyanates.

More preferably, the polyisocyanates are oligomerized aliphatic and/or cycloaliphatic di- or triisocyanates, it being possible to use especially the above aliphatic and/or cycloaliphatic di- or triisocyanates.

Very particular preference is given to polyisocyanates having isocyanurate, uretdione and/or iminooxadiaginedione structures, and biurets based on HDI or mixtures thereof.

Isocyanate-reactive compounds b1) used may be alcohols, amino or mercapto compounds, preferably alcohols. These may especially be polyols. Most preferably, isocyanate-reactive compounds b1) used may be polyester polyols, polyether polyols, polycarbonate polyols, poly(meth)acrylate polyols and/or polyurethane polyols.

Suitable polyester polyols are, for example, linear polyester diols or branched polyester polyols, which can be obtained in a known manner by reaction of aliphatic, cycloaliphatic or aromatic di- or polycarboxylic acids or anhydrides thereof with polyhydric alcohols of OH functionality≥2. Examples of suitable di- or polycarboxylic acids are polybasic carboxylic acids such as succinic acid, adipic acid, suberic acid, sebacic acid, decanedicarboxylic acid, phthalic acid, terephthalic acid, isophthalic acid, tetrahydrophthalic acid or trimellitic acid, and acid anhydrides such as phthalic anhydride, trimellitic anhydride or succinic anhydride, or any desired mixtures thereof. The polyester polyols may also be based on natural raw materials such as castor oil. It is likewise possible that the polyester polyols are based on homo- or copolymers of lactones, which can preferably be obtained by addition of lactones or lactone mixtures, such as butyrolactone, ε-caprolactone and/or methyl-ε-caprolactone onto hydroxy-functional compounds such as polyhydric alcohols of OH functionality≥2, for example of the hereinbelow mentioned type.

Suitable diols or mixtures comprise the polyhydric alcohols of OH functionality≥2 mentioned per se in the context of the polyester segments, preferably butane-1,4-diol, hexane-1,6-diol and/or 3-methylpentanediol. It is also possible to convert polyester polyols to polycarbonate polyols.

Additionally suitable as constituents of the polyol component b1), as polyfunctional, isocyanate-reactive compounds, are also low molecular weight (i.e. with molecular weights≤500 g/mol), short-chain (i.e. containing 2 to 20 carbon atoms), aliphatic, araliphatic or cycloaliphatic di-, tri- or polyfunctional alcohols.

It is especially preferable when the polyol component is a difunctional polyether, polyester, or a polyether-polyester block copolyester or a polyether-polyester block copolymer having primary OH functions.

It is also preferable when the isocyanate-reactive compounds b1) have a number-average molar mass of ≥200 and ≤10 000 g/mol, further preferably ≥500 and ≤8000 g/mol and most preferably ≥800 and ≤5000 g/mol. The OH functionality of the polyols is preferably 1.5 to 6.0, more preferably 1.8 to 4.0.

The isocyanate-reactive component may especially comprise compounds having a numerical average of at least 1.5 and preferably 2 to 3 isocyanate-reactive groups.

The writing monomers may be compounds capable of photoinitiated polymerization. These are cationically and anionically polymerizable and also free-radically polymerizable compounds. Particular preference is given to free-radically polymerizable compounds. Examples of suitable classes of compounds are unsaturated compounds such as (meth)acrylates, α,β-unsaturated carboxylic acid derivatives such as, for example, maleates, fumarates, maleimides, acrylamides, and also vinyl ethers, propenyl ethers, allyl ethers and compounds containing dicyclopentadienyl units, and also olefinically unsaturated compounds, for example styrene, α-methylstyrene, vinyltoluene and/or olefins, comprises or consists of. It is further also possible for thioene reactive compounds, e.g. thiols and activated double bonds, to be free-radically polymerized.

Urethane (meth)acrylates are also usable as writing monomers with particular preference.

It is very particularly preferable for the writing monomers to comprise or consist of one or more urethane (meth)acrylates.

Urethane (meth)acrylates herein are compounds having at least one acrylic ester or methacrylic acid group as well as at least one urethane bond. Compounds of this kind can be obtained, for example, by reacting a hydroxy-functional (meth)acrylate with an isocyanate-functional compound.

Examples of isocyanate-functional compounds usable for this purpose are monoisocyanates, and the monomeric diisocyanates, triisocyanates and/or polyisocyanates mentioned under a). Examples of suitable monoisocyanates are phenyl isocyanate, the isomeric methylthiophenyl isocyanates. Di-, tri- or polyisocyanates have been mentioned above, and also triphenylmethane 4,4',4"-triisocyanate and tris(p-isocyanatophenyl) thiophosphate or derivatives thereof with urethane, urea, carbodiimide, acylurea, isocyanurate, allophanate, biuret, oxadiazinetrione, uretdione, iminooxadiazinedione structure and mixtures thereof. Preference is given to aromatic di-, tri- or polyisocyanates.

Useful hydroxy-functional acrylates or methacrylates for the preparation of urethane acrylates include, for example, compounds such as 2-hydroxyethyl (meth)acrylate, polyethylene oxide mono(meth)acrylates, polypropylene oxide mono(meth)acrylates, polyalkylene oxide mono(meth)acrylates, poly(ε-caprolactone) mono(meth)acrylates, for example Tone® M100 (Dow, Schwalbach, DE), 2-hydroxypropyl (meth)acrylate, 4-hydroxybutyl (meth)acrylate, 3-hydroxy-2,2-dimethylpropyl (meth)acrylate, hydroxypropyl (meth)acrylate, 2-hydroxy-3-phenoxypropyl acrylate, the hydroxy-functional mono-, di- or tetraacrylates of polyhydric alcohols such as trimethylolpropane, glycerol, pentaerythritol, dipentaerythritol, ethoxylated, propoxylated or alkoxylated trimethylolpropane, glycerol, pentaerythritol, dipentaerythritol or the technical mixtures thereof. Preference is given to 2-hydroxyethyl acrylate, hydroxypropyl acrylate, 4-hydroxybutyl acrylate and poly(ε-caprolactone) mono(meth)acrylate.

Preference is given especially to urethane (meth)acrylates obtainable from the reaction of tris(p-isocyanatophenyl) thiophosphate and/or m-methylthiophenyl isocyanate with alcohol-functional acrylates such as hydroxyethyl (meth)acrylate, hydroxypropyl (meth)acrylate and/or hydroxybutyl (meth)acrylate.

It is also preferable for compounds to be used as writing monomers that have two or more free-radically polymerizable groups per molecule (multifunctional writing monomers). These are usable alone or in combination with writing monomers having just one free-radically polymerizable group per molecule.

Preferably, therefore, the writing monomers may comprise or consist of at least one mono- and/or one multifunctional (meth)acrylate writing monomer. More preferably, the writing monomers may comprise or consist of at least one mono- and/or one multifunctional urethane (meth)acrylate. It is very particularly preferable for the writing monomers to comprise or consist of at least one monofunctional urethane (meth)acrylate and at least one multifunctional urethane (meth)acrylate.

Suitable (meth)acrylate writing monomers are especially compounds of general formula (I)

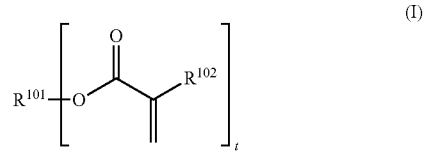

where t is ≥1 and t≤4 and $R^{101}$ is a linear, branched, cyclic or heterocyclic unsubstituted or else optionally heteroatom-substituted organic moiety and/or $R^{102}$ is hydrogen, a linear, branched, cyclic or heterocyclic unsubstituted or else optionally heteroatom-substituted organic moiety. More preferably, $R^{102}$ is hydrogen or methyl and/or $R^{101}$ is a linear, branched, cyclic or heterocyclic organic moiety which is unsubstituted or else optionally substituted with heteroatoms.

The photoinitiator system comprises at least one photoinitiator.

Photoinitiators in the present case are compounds activatable by means of actinic radiation, which can trigger polymerization of the writing monomers. In the case of the photoinitiators, a distinction can be made between unimolecular (type I) and bimolecular (type II) initiators. In addition, they are distinguished by their chemical nature as photoinitiators for free-radical, anionic, cationic or mixed types of polymerization.

In the context of this invention, preference is given to using type II photoinitiators. Therefore, in one preferred embodiment, the photoinitiator system consists of a sensitizer that absorbs in the visible spectrum and of a co-initiator, wherein the co-initiator may preferably be a borate co-initiator.

Photoinitiators of this kind are described in principle in EP 0 223 587 A and consist preferably of a mixture of one or more dyes with ammonium alkylarylborate(s).

It is most preferable when the photoinitiator system comprises a combination of dyes whose absorption spectra at least partly cover the spectral range from 400 to 800 nm, with at least one coinitiator matched to the dyes.

In a further preferred embodiment, the photopolymer layer comprises fluorourethanes, wherein these may preferably be compounds conforming to formula (II)

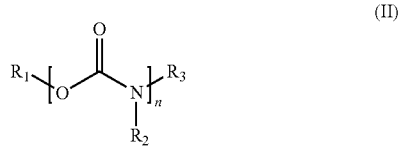

(II)

in which n is ≥1 and n≤8 and $R_1$, $R_2$ and $R_3$ are each independently hydrogen or linear, branched, cyclic or heterocyclic, unsubstituted or else optionally heteroatom-substituted organic moieties, wherein at least one of $R_1$, $R_2$ and $R_3$ is substituted by at least one fluorine atom and more preferably $R_1$ is an organic moiety having at least one fluorine atom.

The holographic optical element may have a planar, spherical or cylindrical shape. It is also possible to use aspherical shapes. It is also possible to use free-form shapes.

These forms may be provided in various ways. For instance, the holographic recording materials may be applied to a shaped substrate by a coating operation, for example dip-coating, spray-coating, spin-coating. What is advantageous about these methods is that the holographic exposure can be effected directly with these geometries.

For planar substrates, it is possible to use coating bars, slot-coating application methods to film substrates. In the next step, it is then possible to effect the holographic exposure and then to use a shaping method to obtain shaped film bodies.

Shaped film bodies as holographic optical element are important especially when very compact forms of the optical casting produced are to be obtained with the aid of the process according to the invention. Since the production of planar holographic optical elements can be implemented efficiently in a roll-to-roll operation, it is preferable to use planar holographic optical elements. In this case, a holographic optical element may also fill only parts of the overall area of the optical casting, such that it is then favourable to choose the film of the holographic recording material, in terms of its projection area at right angles to the optical axis, if appropriate, to be just as large as the first or second surfaces of the mould sections. The planar holographic optical element then fills only a partial region of the holographic recording material; the remaining area region can then be shaped.

It is also possible to use the holographic optical element in a shape, for example in a spherical shape, in an aspherical shape. It is particularly preferable to use the same shape of the first and second surfaces of the mould sections. The holographic element may be exposed into the holographic recording material before the shaping. In this case, it is important to take account of the later shape in the exposure. In the case of specific optical functions (for example in the case of an optical notch filter—i.e. an on-axis reflection hologram), the shaping may also be desired in order to adjust the optical function in a controlled manner through the shaping. In selected cases of monoaxial shaping, such a process is a particular option.

Typical shaping methods for this purpose are those that are customary for the choice of substrate of the holographic recording material. Films can be shaped in deep drawing methods, for example thermoforming or the high-pressure forming method (HPF).

The holographic optical element may also contain orifices or apertures or slots, which is especially advantageous when the film of the holographic recording method fills the entire area of the optical article. In this case, the orifices serve for homogeneous filling of the internal volume of the casting mould by the casting material, in order, inter alia, to enable material flow, or for gas compensation in the case of complete filling. It is preferable that these orifices are at the outer edge of the holographic optical element, since these can be removed again in the later processing step (for example by a cutting or grinding operation in which the corresponding region is removed).

In addition, the holographic optical element can be integrated into an optical layer structure, the layer structure being configured such that light can be input into the layer structure, can propagate along the extent of the layers of the layer structure, and can be emitted from the surrounding optical casting via the at least one holographic optical element. Preferably, the optical layer structure can be configured in such a way that light can propagate in the lateral direction of the optical holographic element with total reflection. For this purpose, the refractive index of the outer layers of the layer structure comprising the at least one holographic optical element must be lower than the refractive index of the photopolymer layer containing the holographic optical element and of any separate light guide layer. Thus, it is especially possible to introduce light or image information through the edge of the holographic optical element and to extract it in a controlled manner through the holographic optical element.

Advantageously, it is also possible to use light guides on which the holographic optical element is present. Structures of this kind also have outer layers of low refractive index, in order to enable total reflection. It may be advantageous for the holographic optical element to have a planar form. Wedge-shaped geometries are also possible. Other narrowing geometries may also be used. In a particularly advantageous embodiment, the holographic optical element comprises a light input component which projects out of the inner volume of the casting mould, while an extracting functional component is present within the casting mould or at a later stage within the casting. The two holographic optical elements are in optical contact via a light guide, while the adjoining layers are of particularly low refractive index, in order to enable internal total reflection in the light guide of light which is introduced through the input component of the holographic optical element and is emitted through the extracting component of the holographic optical element. In a particularly preferred variant, the input and extraction components of the holographic optical element are two separately exposed volume holograms present in one and the same holographic recording material.

The holographic optical element may be a reflection, transmission, in-line, off-axis, full-aperture transfer, white light transmission, Denisyuk, off-axis reflection or edge-lit hologram, or else a holographic stereogram, preferably a reflection, transmission or edge-lit hologram.

Possible optical functions of the holograms correspond to the optical functions of light elements such as lenses, mirrors, deflecting mirrors, filters, diffuser lenses, directed diffusion elements, directed holographic diffusers, diffractive elements, light guides, waveguides, input/extraction elements, projection lenses and/or masks. In addition, a plurality of such optical functions can be combined in such a hologram, for example such that the light is deflected in a different direction according to the incidence of light. For example, it is possible with such structures to build autostereoscopic or holographic electronic displays. It is further possible to realize automotive head-up displays or head-mounted displays. Thus, it is likewise possible to use the optical castings produced by the process according to the invention in corrective pairs of glasses or sunglasses and other visual aids and pairs of glasses.

These holographic optical elements frequently have a specific frequency selectivity according to how the holograms have been exposed and the dimensions of the hologram. This is important especially when monochromatic light sources such as LEDs or laser light are used. For instance, one hologram is required per complementary colour (RGB), in order to deflect light in a frequency-selective manner and at the same time to enable full-colour head-up displays. Therefore, there are certain display setups where two or more holograms have to be exposed inside each other into the photopolymer layer.

In addition, it is also possible to produce holographic images or representations of, for example, personal portraits, biometric representations in security documents, or generally of images or image structures for advertising, security labels, brand protection, branding, labels, design elements, decorations, illustrations, collectable cards, images and the like, and also images which can represent digital data or the like, or else combinations of the above in the holographic optical element can be integrated into an optical casting. Holographic images can have the impression of a three-dimensional image, but they may also represent image sequences, short films or a number of different objects according to the angle from which and the light source with which (including moving light sources) etc. they are illuminated. Because of these various design options, the optical castings produced by the process according to the invention represent a viable solution for the abovementioned applications. It is also possible to use such holograms for storage of digital data, using a wide variety of different exposure methods (shift, spatial or angular multiplexing).

The optical castings produced by the process according to the invention can also be used for optical displays based on liquid crystals, organic light-emitting diodes (OLEDs), LED display panels, microelectromechanical systems (MEMS) based on diffractive light selection, electrowetting displays (E-ink) and plasma display screens. Optical displays of this kind may be autostereoscopic and/or holographic displays, transmittive and reflective projection screens, displays with switchable restricted emission characteristics for privacy filters and bidirectional multiuser screens, virtual displays, head-up displays, head-mounted displays, illumination symbols, warning lamps, signal lamps, floodlights and display panels. The casting material comprises one-pack or else multi-pack, for example two-pack, casting systems.

According to the invention, the casting material at the time of introduction into the casting cavity, i.e. the inner volume of the casting mould, has a viscosity of less than 100 000 mPas at 25° C. Advantageously, the viscosity is less than 5000 mPas, preferably less than 500 mPas and more preferably less than 100 mPas.

The casting material comprises one or more monomers and/or oligomers bearing at least one functional group. These functional groups may be one of the following: acryloyl, methacryloyl, vinyl, allyl, isocyanate, isothiocyanate, alcohol, acid, oxirane, thiirane, thiol and amine, particular preference being given to the isocyanate- and allyl-functional groups, very particular preference to the isocyanate-functional groups.

The casting systems here may, for example, be those based on diethylene glycol bis(allyl carbonate) (CR39, Allyldiglycolcarbonate ADC); see also F. Strain, in "Encyclopedia of Chemical Processing and Design", 1st Ed., Dekker Inc. New York, Vol. 11, p. 432 ff, these being thermally curable by means of peroxides. In addition, it is also possible to mix and polymerize ethacrylates, methacrylates and acrylates, styrene, vinyl acetate, acrylonitrile and other free radically polymerizable monomers with or without ADC.

Polyurethane systems are also suitable and consist of an isocyanate-functional portion and components that react with isocyanates.

Suitable isocyanates are those based on aliphatic isocyanates, for example hexamethylene diisocyanate (HDI), 3-isocyanatomethyl-3,5,5-trimethylcyclohexyl isocyanate (IPDI), 4,4'-methylenebis(cyclohexyl isocyanate) (H12MDI), methyl cyclohexane-2,4-diisocyanate, methyl cyclohexane-2,6-diisocyanate, 1,3- or 1,4-bis(isocyanatomethyl)cyclohexane (H6XDI), and bis(isocyanatomethyl)norbornane (NBDI), and also aralkyl isocyanates, for example xylylene 1,3- or 1,4-diisocyanate (XDI) and also tetramethylxylylene disocyanate (TMXDI). At the same time, it is also possible to use the monomeric diisocyanates and the oligomers thereof. Mixtures of different diisocyanates and different oligomers with each another or with one another are also possible. Also usable are mixed oligomers, i.e. those consisting of two or more different diisocyanates. Oligomers are understood to mean corresponding products which can be prepared from two or more diisocyanates with formation of urethane, urea, carbodiimide, acylurea, amide, isocyanurate, allophanate, biuret, oxadiazinetrione, uretdione and/or iminooxadiazinedione structures. It is likewise possible to prepare what are called isocyanate-functional prepolymers by reacting, for example, low molecular weight di-, tri- or polyols based on polyethers, polyesters, polycarbonates having molecular weights below Mw=5000, preferably below Mw=2000, with aforementioned diisocyanates in an isocyanate excess. The components that react with diisocyanates are polyols, for example polyether polyols, polyester polyols, polycarbonate polyols, polyacrylate polyols, epoxy polyols, naturally occurring fatty acid-based polyols, silicone polyols, fluorinated polyols and polyolefin polyols. These too may be used together or alone.

Polyether polyols may be polypropylene polyols, polyethylene oxide polyols, C-4 ether polyols (polyTHF polyols), which are generally prepared via catalytic processes by means of a low molecular weight alcohol or water/hydroxide ions as starter.

As component that reacts with isocyanates, it is also possible to use (di)amines, for example the Jeffamines (Huntsman Int. LLC, Salt Lake City, Utah, USA), Desmophen NH (Bayer MaterialScience AG, Leverkusen, Germany), but also aromatic amines, for example 2,4- and 2,6-diamino-3,5-diethyltoluene (Ethacure 100 from Albemarle Corp, Baton Rouge, La., USA) or dimethylthiotoluenediamine (Ethacure 300 from Albemarle Corp, Baton Rouge, La., USA), and mono- and poly-methyl-, -ethyl- and/or -isopropyl-substituted methylenediphenylamines (Lonzacure, from Lonza Ltd., Basle, Switzerland).

Commercially available polyurethane casting materials are, for example, BAYTEC® OCS 080D (Bayer MaterialScience LLC, Pittsburgh, Pa., USA), Trivex (PPG, Pittsburgh, Pa., USA).

Likewise suitable are thiopolyurethane systems in which the component that reacts with isocyanates is polythiols.

It is also possible to use silicon, tin and zirconium compounds which have been complexed by up to four polythiols (US2008/27198).

The casting system may optionally contain one or more catalysts. Catalysts to speed the isocyanate addition reaction may be concerned here in particular. Suitable catalysts are those based on tin, zinc, zirconium, bismuth and titanium, and amines. Examples thereof are tin octoate, zinc octoate, butyltin trisoctoate, dibutyltin dilaurate, dimethylbis[(1-oxoneodecyl)oxy]stannane, dimethyltin dicarboxylate, zirconium bis(ethylhexanoate), zirconium acteylacetonate or tertiary amines such as, for example, 1,4-diazabicyclo[2.2.2] octane, diazabicyclononane, diazabicycloundecane, 1,1,3,3-tetramethylguanidine, 1,3,4,6,7,8-hexahydro-1-methyl-2H-pyrimido(1,2-a)pyrimidine. Catalysts used may also be inorganic tin-containing catalysts. Catalysts of this kind may be cyclic tin compounds which are complexed from saturated or unsaturated, linear or branched, aliphatic or cycloaliphatic or optionally substituted aromatic or arylaliphatic radicals which may optionally contain heteroatoms from the group of oxygen, sulphur and nitrogen, for example: 4,12-dibutyl-2,6,10,14-tetramethyl-1,7,9,15-tetraoxa-4,12-diaza-8-stannaspirol[7.7]pentadecane, 4,12-dibutyl-1,7,9,15-tetraoxa-4,12-diaza-8-stannaspirol[7.7]pentadecane, 4,12-dimethyl-1,7,9,15-tetraoxa-4,12-diaza-8-stannaspirol[7.7] pentadecane, 2,4,6,10,12,14-hexamethyl-1,7,9,15-tetraoxa-4,12-diaza-8-stannaspirol[7.7]pentadecane, and 2,2-dichloro-6-methyl-1,3,6,2-dioxazastannocane. It is also possible to use bismuth and zinc salts of fatty acids, for example stearates, neodecanoate and versatates, tetraalkyl titanates such as tetraethyl or tetrabutyl titanate.

In addition, it is also possible to add additives such as demoulding agents, plasticizers, antifoams, levelling agents, fire retardants, thixotropic agents, thickeners, antistats, reaction inhibitors, desiccants, antioxidants, UV absorbers, stabilizers.

The casting system may be mixed from its several components at room temperature. This is done using an NCO:OH equivalents ratio of 1.5 to 0.7, preferably 1.3 to 0.9. The mixture is then introduced into the casting mould and heated therein to up to 150° C., preferably up to 130° C., over 0.5-48 hours, preferably 1-24 hours. The heating can advantageously be effected in stages; for instance, a first heating to 40-100° C. and heat treatment at this temperature is suitable for achieving optimal filling. Heating is then effected at a later stage to the maximum temperature in order to obtain good through-curing. It is also possible to use more than two temperature hold times or gradual continuous (for example linear) heating. Curing is followed by gradual cooling, typically at room temperature. It is also possible to choose a heat treatment step at a temperature below the highest curing temperature. If the mould has cooled down, the mouldings can be removed from the casting mould.

The casting mould may be filled manually or else filled by automated methods, for example reactive injection moulding (RIM), reactive transfer moulding (RTF). For the latter, it is then also possible to manufacture the casting mould from other materials, preferably from metals (for example stainless steel, but also iron, nickel, copper, aluminium, chromium, silver, gold, or alloys thereof). If at least one of the two mould sections has a sleeve, this may likewise be manufactured from metal.

Mixing can be accomplished using stirring tools, static mixers, fast-moving vessels and the like. It is also advantageous to degas the casting system. For this purpose, reduced pressure may be applied and/or the surface area can be increased by means of a falling film, which avoids bubble formation.

A further aspect of the present invention relates to an optical casting comprising at least one holographic optical element, produced by a process according to any of Claims 1 to 13.

The optical casting can be used for diffractive optical transparent components and refractive and diffractive hybrid optics and lenses. Optical elements such as aspherical lenses, integrated lens systems and modules, diffractive optics & Fresnel lenses, off-axis parabolic mirrors, cylindrical lenses, gradient index lenses (GRISM), total internal reflection lenses (TIR), prisms, reflective optics, mirrors and cubic optics, lens arrays and moth-eye optics, optical combiners, free-form optics, collimating lenses, lattice structures can thus be improved in terms o their optical performance, be built in more compact form or be extended with further optical functions. The optical function of the optical casting which has a holographic element and has been produced by the process according to the invention may contain two independently utilizable optical functions (i.e. a refractive function which is determined by the casting mould and a diffractive function which is determined by the holographic optical element). It is likewise also possible that the two functions are connected synergistically to one another. For instance, it is possible to compensate for imaging errors in the refractive system by means of the diffractive system. These may be monochromatic errors (spherical aberration, astigmatism, coma, image field curvature and distortion), chromatic aberrations (lateral and axial colour errors, gaussian errors), edge light falloff and vignetting.

In addition, the optical casting can be used for specific optical functions, including possible uses without refractive optical functions, i.e. of the optical casting are planar in accordance with the design of the first and second surfaces of the two mould sections. Thus, it is possible to realize beam shapers, for example top-hat beam shapers, stable-top beam shapers, homogenizers/diffusers, elliptical diffusers, vortex lenses, multispot elements, beam sampler elements, multi-focus elements, diffraction-limited focusing devices, achromatic correctors, planar lenses, correctors of astigmatism, chromatic correctors for several wavelengths.

A further aspect of the present invention relates to pairs of glasses, for example corrective glasses, varifocal glasses, trifocal glasses and varifocal glasses, corrective glasses for display screen work and for driving, sunglasses, glasses with a polarization function, protective glasses, functional glasses, glasses with an installed electronic display for augmented reality or data glasses, automobile front headlamp or reversing light, microscope, floodlight, pocket torch, photographic lens for cameras and smartphones, projection optics in (electronic) projectors, secondary optics in light-emitting diodes and lasers, LED lamps, lights and corrective optics for electronic image sensors, comprising an optical casting according to Claim 14.

Figure 9:
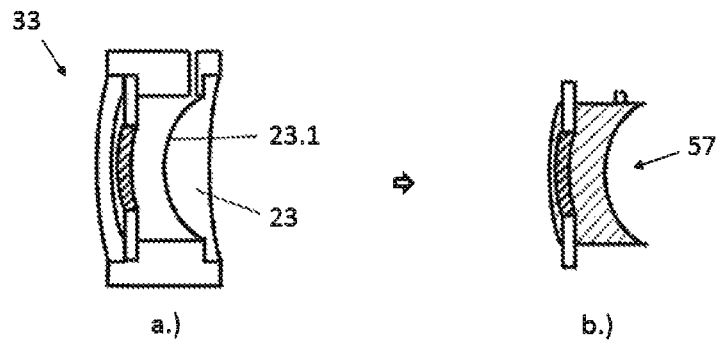
Figure 10:
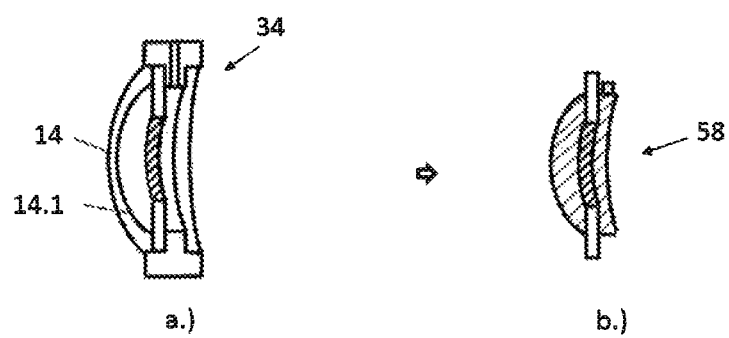
Figure 11:
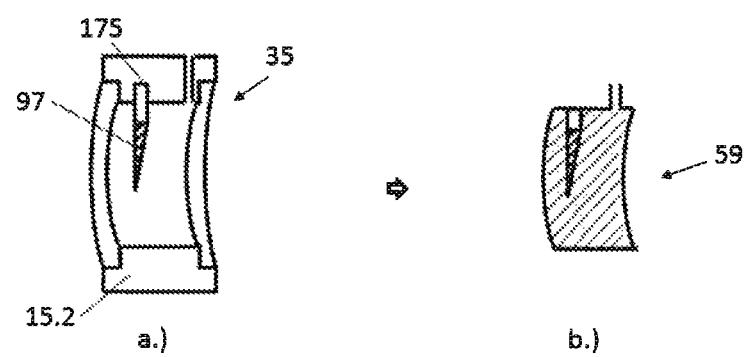
Figure 12:
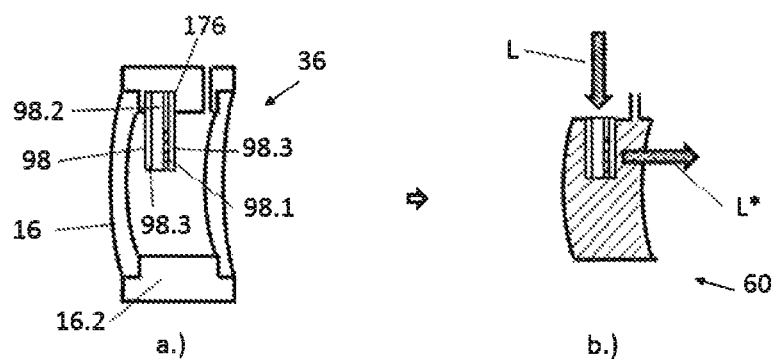
Figure 13:
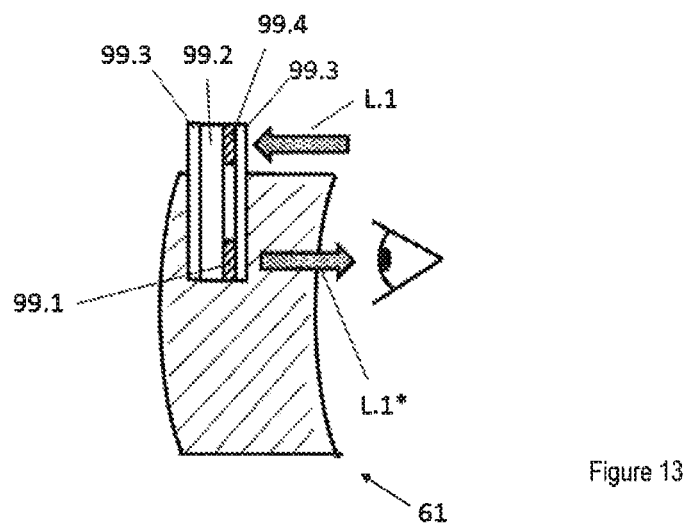
Figure 14:
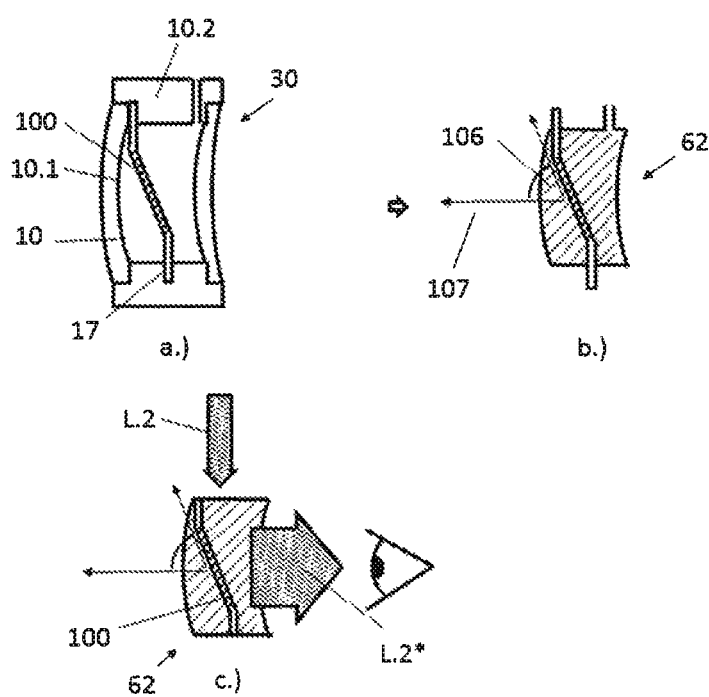

The invention is elucidated in detail hereinafter with reference to drawings. The figures show:

FIG. 1a-c three different casting moulds with differently configured mould sections, one of the mould sections comprising a sleeve, FIG. 2a-g a process for producing an optical casting having a holographic optical element in a first configuration, FIG. 3a-d a process for producing an optical casting having a holographic optical element in a second configuration, FIG. 4a-d a process for producing an optical casting having a holographic optical element in a third configuration, FIG. 5a, b a casting mould with a concave surface formed by correspondingly shaped mould sections and a convex surface and with a holographic optical element having planar structure, and an optical casting obtainable therefrom, FIG. 6a, b a casting mould having a concave surface and a convex surface and having a holographic optical element having planar structure and a further film section connected thereto, and an optical casting obtainable therefrom, FIG. 7a, b a casting mould having a concave surface and a convex surface and having a planar holographic optical element on a carrier having an offset structure, and an optical article obtainable therefrom, FIG. 8a, b a casting mould with a concave surface and a convex surface and with a sphere-shaped holographic optical element, and an optical casting obtainable therefrom, FIG. 9a, b a casting mould with a concave surface and a convex surface and with a sphere-shaped holographic optical element, and an optical article for correction of short sight obtainable therefrom, FIG. 10a, b a casting mould with a concave surface and a convex surface and with a sphere-shaped holographic optical element, and an optical casting for correction of long sight obtainable therefrom, FIG. 11a, b a casting mould with a concave surface and a convex surface and with a holographic optical element having wedge-shaped structure, and an optical casting obtainable therefrom, FIG. 12a, b a casting mould with a concave surface and a convex surface and with a layer structure comprising a holographic optical element positioned on a light guide, and an optical casting obtainable therefrom, FIG. 13 an optical casting having a layer structure which partly projects into the casting and comprises two holographic optical elements positioned on a light guide, FIG. 14a-c a casting mould having a concave surface and a convex surface and a holographic optical element aligned at an angle to the optical axis of the casting, and an optical casting obtainable therefrom, and additionally a functional view of this optical casting, FIG. 15a-g a process for producing an optical casting having a holographic optical element in a fourth configuration and FIG. 16a-g a process for producing an optical casting having a holographic optical element in a fifth configuration.

FIG. 1a shows a casting mould 30 formed from a first mould section 10 and a second mould section 20. Said casting mould surrounds a casting cavity 40. The first mould section 10 comprises a first surface 10.1, concave in the present case, facing the casting cavity 40 and a sleeve 10.2 manufactured from a plastic, for example PVC or rubber. The second mould section 20 likewise comprises a convex surface which faces the casting cavity 40 and is referred to here as second surface 20.1. By the sleeve 10.2, the first mould section 10 can be connected tightly to the second mould section 20. The two mould sections 10, 20 may be manufactured from a suitable metallic material or else from glass.

For introduction of the casting material, the sleeve 10.2 has a filling orifice 5. In addition, FIG. 1a shows a front view of the casting mould 30. Accordingly, the casting mould 30 is spherical in this viewing direction. It will be appreciated that other geometries can also be implemented, for example an elliptical, rectangular, square or any other polygonal form, or a free form.

In contrast to the casting mould 30 of FIG. 1a, the second mould section 21 of the casting mould 31 shown in FIG. 1b likewise has a concave second surface 21.1. FIG. 1c in turn shows a casting mould 32 in which the second surface 22.1 of the second mould section 22 has a planar form.

FIG. 2 shows a process for producing an optical casting comprising a holographic optical element by means of a casting operation in a first embodiment. According to step a), a mould section is provided, in the present case the second mould section 20 with convex second surface 20.1 of FIG. 1a. Subsequently, the second mould section 20 is provided in step b) with an adhesive droplet 20.2. In step c), a holographic optical element 90 is positioned onto the adhesive droplet 20.2 and aligned. In step d), the second mould section 10 having the surface 10.1, the adhesive droplet 20.2 and the holographic optical element 90 is then connected to the sleeve 10.2 of the first mould section 10 of FIG. 1a to form the casting mould 30 having the casting cavity 40. In step e), the casting material 7 is introduced via the filling orifice 5 by means of the metering system 13. Casting materials used may be one-pack or else multi-pack, for example two-pack, casting systems, the casting material at the time of introduction into the casting cavity 40 having a viscosity of less than 100 000 mPas at 25° C.

In step f), the casting material is cured and then the casting mould 30 is dismantled. This gives an optical casting 50 as shown by step g). Said casting has a first convex surface 50.1 and a second concave surface 50.2 and contains, in its internal volume, the holographic optical element 90.

FIG. 3 describes a further embodiment of the process for producing an optical casting comprising at least one holographic optical element by means of at least one casting operation. In step a), a casting mould 30 is provided, which is formed by a first mould section 10 which, in turn, comprises a first surface 10.1 and a sleeve 10.2 with filling orifice 5 for the casting material, and a second mould section 20 having a second surface 20.1. Within the casting mould 30 is disposed a holographic optical element 91 which, in turn, is part of a film section 14 which is positioned and aligned between the surface 10.1 and the sleeve 10.2. This film section 14 is configured as a rectangle in such a way that its four corner sections are fixed between the sleeve 10.2, which is again sphere-shaped in the present case, and the first surface 10.1. The film section 14 may, for example, be a section of a holographic recording film which has been partially exposed, such that a holographic optical element 91 is disposed in the middle thereof. The film section 14 may additionally also have further films and/or protective lacquer layers (not shown) which protect the film section 14 from chemical and/or mechanical influences. In step b), the casting mould 30 is filled completely with casting material 7 by means of metering system 13, it being possible for the casting material to flow around the side of the rectangular film section 14 for complete filling of the casting mould 30, as apparent in the cross-sectional view of step a). The casting material is cured in step c) and demoulded in step d), and so the optical casting 51 is obtained.

Figure 4:
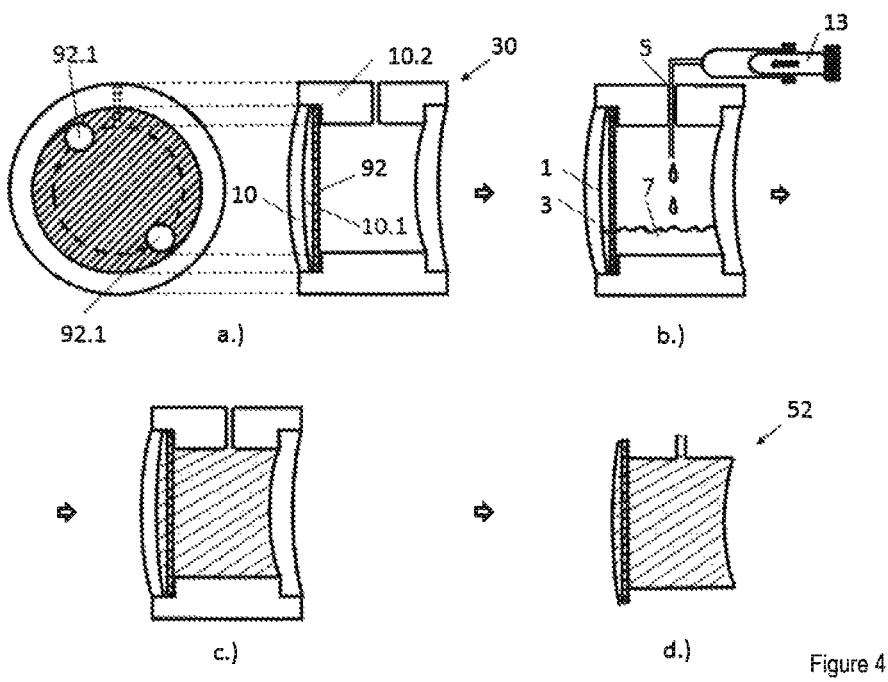

FIG. 4 describes a further embodiment of the process for producing an optical casting comprising at least one holographic optical element by means of a casting operation. As in the case of the process variant described in connection with FIG. 3, a holographic optical element 92 is fixed here too between the surface 10.1 and the sleeve 10.2 of the first mould section 10 and hence positioned and aligned within the casting mould 30. As is apparent, a casting mould having a holographic optical element 92 is again provided (step a)), the holographic optical element being configured here so as to be planar and concentric with the first surface 10.1 and the sleeve 10.2 of the first mould section 10, such that it is fixed with a circumferential section between the sleeve 10.2 and first surface 10.1 and completely covers the first surface 10.1. Accordingly, two orifices 92.1 provided in the holographic optical element 92 allow flow of the casting material 7 (step b)) into the volume section between the holographic optical element 92 and the first surface 10.1 as well, and hence complete filling of the casting mould 30. In step b), the metering system 13 is then used to introduce the casting material 7 through the filling orifice 5 into the internal volume of the casting mould 30, the orifices 92.1 in the holographic optical element 92 serving, as mentioned, to enable complete filling of the casting mould 30. In step c), the curing of the casting material 7 is then conducted and, in step d), the casting mould is removed, so as to obtain an optical casting 52.

FIGS. 5 to 14 below show further casting moulds with a holographic optical element positioned and aligned therein, and the optical castings obtainable therefrom.

Figure 5:
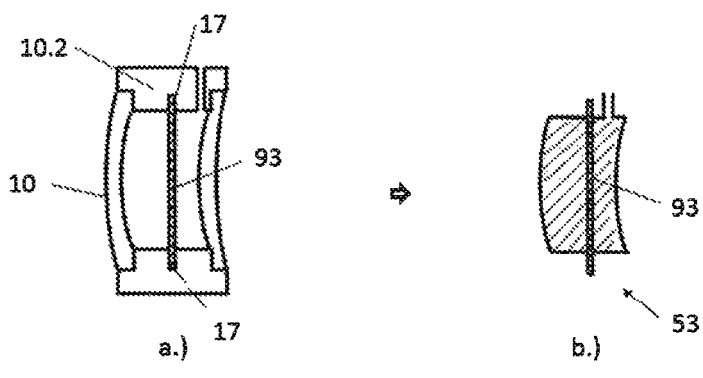

FIG. 5 shows the positioning and alignment of the holographic optical element 93 by means of prepared grooves 17 in the sleeve 10.2 of the first mould section 10. The grooves 17 may take the form of a groove running continuously along the entire inner circumferential face of the sleeve 10.2 if a holographic optical element according to the configuration of FIG. 4 is used, or else may encompass only sub-regions of the sleeve 4 if holographic optical elements of only part of the area are used (see, for example, FIG. 3, step a, front view). This embodiment is especially suitable when subsequent reworking by grinding methods is intended on both flat outer sides of the optical casting 53, and hence a greater distance of the outer sides from the holographic optical element 93 is required.

Figure 6:
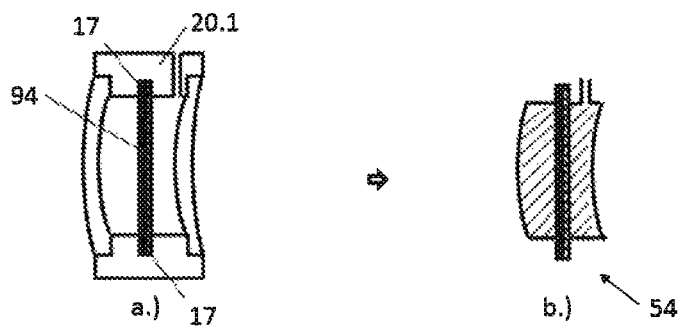

FIG. 6 shows, analogously to FIG. 5, the positioning and alignment of a holographic optical element 94 in prepared grooves 17 in the sleeve 20.1. The holographic optical element 94 is a multilayer structure comprising further protective films and functional films. For example, these protective films and functional films may be polarizer films, colour films, design films, UV protection films, photochromic films or else combinations thereof.

Figure 7:
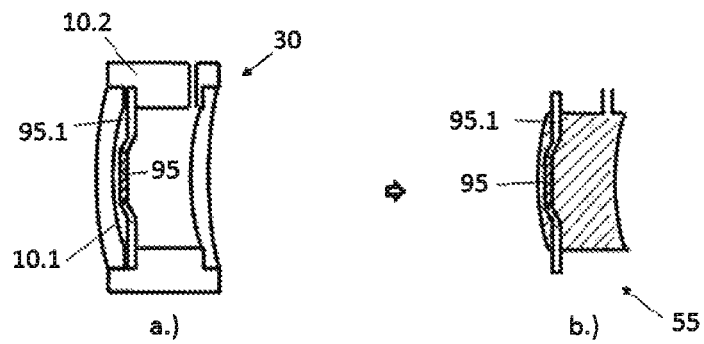

FIG. 7 shows a casting 55 and a casting mould 30 with a planar holographic optical element 95 which has been applied to a film section 95.1 preformed, for example, by thermoforming or by a high-pressure forming method (HPF), having an offset structure as a result of the above forming. The film section 95.1 is positioned and aligned in turn between the sleeve 10.2 and the first surface 10.1.

Figure 8:
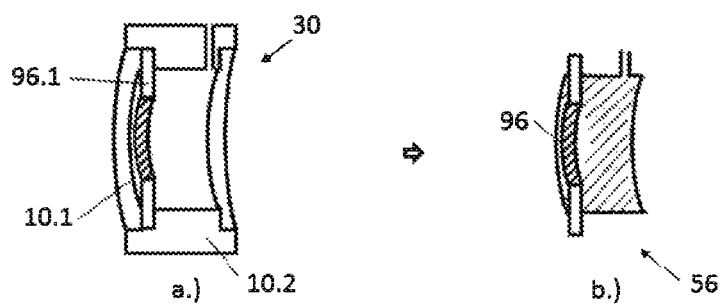

FIG. 8 shows a casting 56 and a casting mould 30 having a spherically curved holographic optical element 96 which is applied flat to a likewise spherically curved preformed film section 96.1 or is formed by a thermoforming or HPF method. The film section 96.1 itself is positioned and aligned in turn between the sleeve 10.2 and the first surface 10.1.

FIG. 9a differs from FIG. 8a in that the second surface 23.1 of the second mould section 23 of the casting mould 33 is more highly convex here, such that the casting 57 obtainable by the casting operation (FIG. 9b), in terms of its refractive optical capacity, is suitable for correction of short sight.

By contrast, the first surface 14.1 of the mould section 14 of the casting mould 34 of FIG. 10a has such a concave shape that the optical casting 58 obtainable by the casting operation, in terms of its refractive optical capacity, is suitable for correction of long sight.

FIG. 11a shows a casting mould 35 in which a wedge-shaped holographic optical element 97 is positioned and aligned in a groove 175 in the sleeve 15.2. The holographic optical element 97 may also be a multilayer structure comprising a wedge-shaped substrate and a planar holographic optical element. FIG. 11b shows the corresponding casting 59.

FIG. 12a shows a casting mould 36 in which a holographic optical element 98 is positioned and aligned in a groove 176 in the sleeve 16.2 of the first mould section 16.

The holographic optical element 98 comprises a multilayer structure which in turn comprises a holographic optical layer element 98.1, a light guide 98.2 and two layers 98.3 of low refractive index. The latter enable light guiding by means of total reflection in the holographic optical element 98.1 and the light guide 98.2. This embodiment is especially suitable for head-up displays which project an image and use a light guide for the purpose. For this purpose, good input of the light at the edge of the light guide is required, as shown in FIG. 12b (arrow L). By a grinding process, it is possible, for example, to achieve the necessary optical quality of the edge of the light guide. The holographic optical layer element 98 then serves to extract the light (arrow L*). FIG. 12b shows the corresponding casting 60 with the input and extraction directions of the light L, L*.

FIG. 13 shows a further preferred embodiment of a casting 61, in which, as in FIG. 12b, a light guide 99.2 is utilized to extract light L.1* by means of the holographic optical layer element 99.1. Here, a further holographic optical layer element 99.4 is also used to input the light L.1 into the light guide 99.2. The light L.1 is projected onto the holographic optical input element 99.4 in such a way that the layers 99.3 of low refractive index allow it to essentially pass through. It is preferable that the light L.1 is projected onto the holographic optical input element 99.4, with respect to its area, at right angles with a difference of up to +/−40° from the direction of gravity. Preference is given to a direction of incidence of +20° to −20°. The light input L.1 is then propagated in the light guide 99.2 and holographic recording material and is reflected at the two layers 99.3 of low refractive index with total reflection until it is extracted at the holographic optical element 99.1 (arrow L.1*). The extraction angle is determined by the diffractive optical function of the optical element 99.1 and is preferably +/−40° with respect to the normal. In FIG. 13, this light is indicated as arrow L.1* and has an extraction angle of 0° at that point, corresponding to the perpendicular.

FIGS. 14a and 14b show a further embodiment of a casting mould 30 and a corresponding optical casting 62 in which a holographic optical element 100—again in planar form here—is arranged at an angle 106 to the optical axis 107 of the refractive optical article 62. The holographic optical element 100 is positioned and aligned between the first surface 10.1 and sleeve 10.2 of the first mould section 10 on one side and groove 17 in sleeve 10.2. The angle between the optical axis 107 and the plane of the holographic optical element 100 is additionally determined by the shape of the holographic optical element 100.

FIG. 14c shows the basic function of the optical casting 62 with the holographic optical element 100. Here, light L.2 is emitted into the optical casting and is diffracted by the holographic structure in the holographic optical element 100, such that it is extracted again as light beam L.2* from the optical casting 62.

Figure 15:
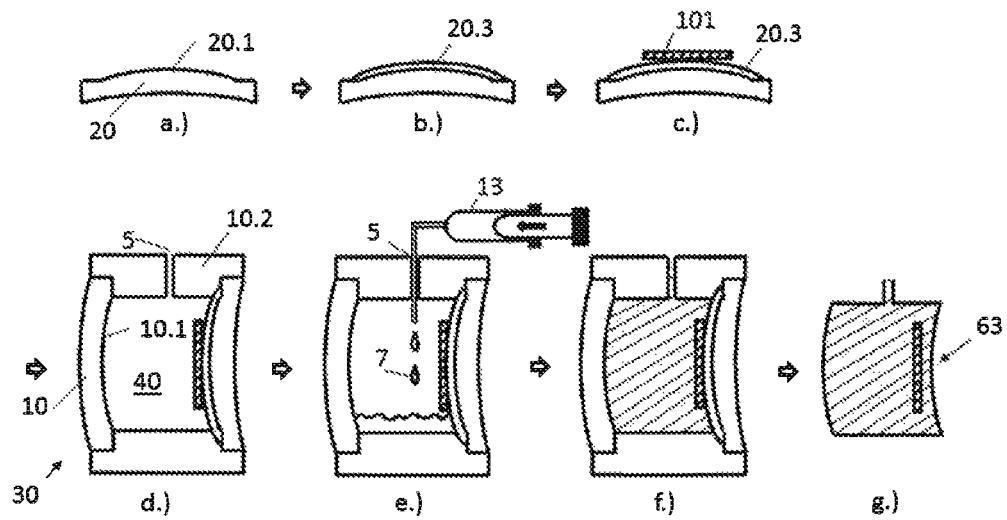

FIG. 15 describes a further embodiment of the process for producing an optical casting 63 comprising at least one volume-holographic optical element by means of a casting mould 30 and a casting operation. In this configuration of the process, a planar holographic optical element 101 is positioned and aligned on a shapeable film 20.3 on the surface 20.1 of the mould section 20. In step a), the surface 20.1 to which a shapeable film 20.3 is applied in step b) is shown. This can be effected, for example, by laminating. It is also possible to mount the film 20.3 beforehand (for example by means of a frame) and to move the surface 20.1 of the mould section 20 towards it. The film 20.3 stretches and adheres cleanly to the surface 20.1. Subsequently, the protruding edges of the film 20.3 are cut off. In step c), the holographic optical element 101 is then positioned on the film 20.3 and aligned. This is accomplished in a particularly simple manner when the film 20.3 has good formability and low tack. In step d), the casting mould 30 composed of the further mould section 10 having the surface 10.1 and the sleeve 10.2 is assembled, so as to give rise to a casting cavity 40. In step e), by means of the metering system 13, the casting material 7 is then transferred via the orifice 5 into the casting cavity 40. The curing step f) is followed by the demoulding in step g).

Figure 16:
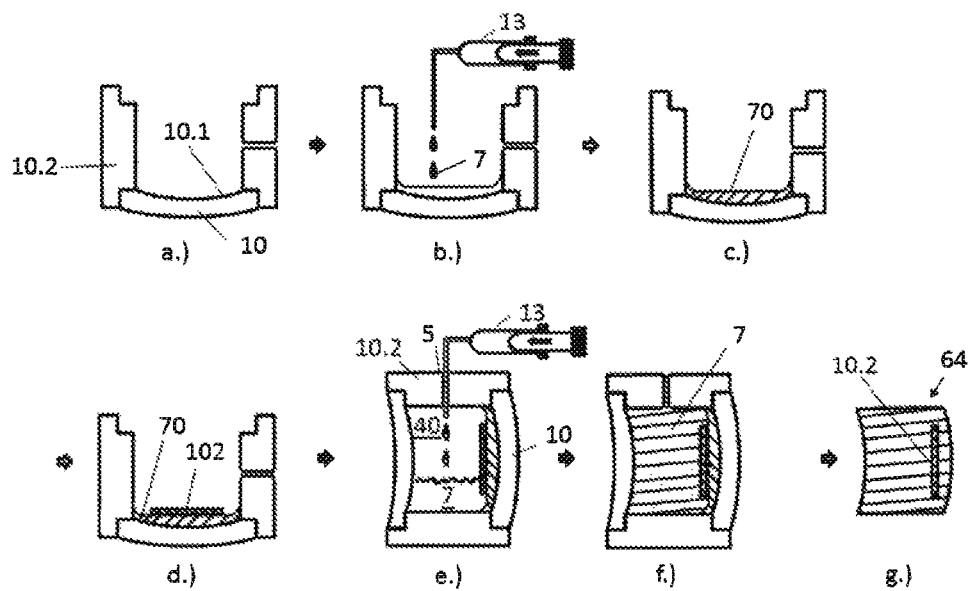

FIG. 16 describes a further embodiment of the process for producing an optical casting 64 comprising at least one volume-holographic optical element 102 by means of a casting mould 30 and a casting operation. In this process variant, a holographic optical element 102 is positioned onto a surface 70 which arises through a 2-step casting and curing process, and aligned. In step a), the first mould section 10 is assembled from the sleeve 10.2 and the first surface 10.1 and set up with the first surface 10.1 at the bottom. In step b), the casting system 7 is introduced onto the first surface 10.1 by means of the metering system 13 until a planar surface 70 arises. In step c), the casting material 7 is cured. It is possible here to conduct the curing only partially, in order that the surface 70 still remains partly tacky. Through-curing is also possible. Preference is given to partial curing. In step d), the holographic optical element 102 is then positioned onto the surface 70 and aligned. In step e), the casting mould 3 is then fully assembled by attaching the second mould section 20 and further casting material 7 is introduced into the casting cavity 40 by means of the metering system 13 through the orifice 5 in the sleeve 10.2 until the casting cavity 40 is completely filled with casting material 7. Subsequently, in step f), the casting system 7 is cured fully. In step g), the optical casting 64 having the holographic optical element 102 produced thereby is demoulded.

Methods of Measurement:
Determination of Viscosity:

Viscosity was determined with a Physica MCR 51 (from Anton Paar) viscometer. For this purpose, the sample was equilibrated and a ball was suspended (for low viscosities η<10 000 mPas: 25° C., ball diameter 25 mm (CP-25) and for high viscosities η>10 000 mPas: 50° C., ball diameter 60 mm (CP-60)). About 0.5-1 g of product was placed onto the plate, and the ball was allowed to drop down, such that the ball was fully wetted with product. Excess product was wiped off. The shear rate (about 500 l/s at lower viscosities and about 100 l/s at higher viscosities) was set automatically by the instrument. 20 measurements were made in each case and the mean was determined.

Determination of Refractive Index:

For high-viscosity and solid products, the refractive index was determined at a wavelength of 589 nm by obtaining the refractive index n from the transmission and reflection spectra as a function of the wavelength of the sample. For this purpose, films of the samples of thickness about 100-300 nm were spun onto quartz glass slides from a five percent by weight solution in ethyl acetate. The transmission and reflection spectrum of this layer assembly was measured with a CD-Measurement System ETA-RT spectrometer from STEAG ETA-Optik, and then the layer thickness and the spectral profile of n were fitted to the measured transmission and reflection spectra. This was done with the spectrometer's internal software and additionally required the n data of the quartz glass substrate, which were determined beforehand in a blank measurement.

For liquid products, an Abbe refractometer was used to determine the refractive index at 589 nm. This was done by applying 3 drops of the product onto the cleaned measurement prism of the instrument, folding down the illumination prism and then equilibrating to 20° C. within 2 minutes. Subsequently, in the observation field, the light/dark boundary was positioned precisely onto the crosshairs of the refractometer. Once there was no longer any variation in the value set, the refractive index was read off on the instrument to four decimal places. A double determination was conducted. Differences of up to 0.0002 scale division were permissible.

Measurement of Haze

Haze was measured to ASTM D 1003. The haze is the percentage of light transmitted which deviates by more than 2.5° on average from the light beam emitted. To measure the haze, the holographic coupons were cleaned on the outside prior to the measurement, in order to avoid distortion of the result by fingerprints and dirt on the glass surfaces. Then the coupons were inserted into a Byk-Gardner Haze-Gard-Plus instrument for analysis. The layer thickness of the coupon was measured as described below in the section "Measurement of the holographic properties DE and Δn of the holographic media by means of twin beam interference in transmission arrangement" in the simulation of the theoretical Bragg curve according to Kogelnik.

Isocyanate Content

Reported NCO values (isocyanate contents) were quantified to DIN EN ISO 11909.

The full conversion of NCO groups, i.e. the absence thereof, in a reaction mixture was detected by IR spectroscopy. Thus, complete conversion was assumed when no NCO band (2261 cm$^{-1}$) was visible in the IR spectrum of the reaction mixture.

Solids Content

An unpainted tin can lid and a paperclip were used to ascertain the tare weight. Then about 1 g of the sample to be analysed was weighed out and then distributed homogeneously in the tin can lid with the suitably bent paperclip. The paperclip remained in the sample for the measurement. The starting weight was determined, then the assembly was heated in a laboratory oven at 125° C. for 1 hour, and then the final weight was quantified. The solids content was quantified by the following equation: Final weight [g]*100/starting weight [g]=% by weight of solids.

Chemicals and Substrates:
Preparation of Polyol 1:

A 1 l flask was initially charged with 0.18 g of tin octoate, 374.8 g of ε-caprolactone and 374.8 g of a difunctional polytetrahydrofuran polyether polyol (equivalent weight 500 g/mol OH), which were heated to 120° C. and kept at this temperature until the solids content (proportion of nonvolatile constituents) was 99.5% by weight or higher. Subsequently, the mixture was cooled and the product was obtained as a waxy solid.

Preparation of Urethane Acrylate 1 (Writing Monomer): Phosphorothioyltris(oxybenzene-4,1-diylcarbamoyloxyethane-2,1-diyl) trisaerylate A 500 ml round-bottom flask was initially charged with 0.1 g of 2,6-di-tert-butyl-4-methylphenol, 0.05 g of dibutyltin dilaurate and 213.07 g of a 27% solution of tris(p-isocyanatophenyl) thiophosphate in ethyl acetate (DesmodurD RFE, product from Bayer MaterialScience AG, Leverkusen, Germany), which were heated to 60° C. Subsequently, 42.37 g of 2-hydroxyethyl acrylate were added dropwise and the mixture was still kept at 60° C. until the isocyanate content had fallen below 0.1%. This was followed by cooling and complete removal of the ethyl acetate in vacuo. The product was obtained as a partly crystalline solid.

Preparation of Urethane Acrylate 2 (Writing Monomer): 2-({[3-(Methylsulphanyl)phenyl]carbamoyl}oxy)ethyl prop-2-enoate A 100 ml round-bottom flask was initially charged with 0.02 g of 2,6-di-tert-butyl-4-methylphenol, 0.01 g of Desmorapid Z, 11.7 g of 3-(methylthio)phenyl isocyanate [28479-1-8], and the mixture was heated to 60° C. Subsequently, 8.2 g of 2-hydroxyethyl acrylate were added dropwise and the mixture was still kept at 60° C. until the isocyanate content had fallen below 0.1%. This was followed by cooling. The product was obtained as a colourless liquid.

Preparation of Additive 1 bis(2,2,3,3,4,4,5,5,6,6,7,7-dodecafluoroheptyl)(2,2,4-trimethylhexane-1,6-diyl) biscarbamate A 50 ml round-bottom flask was initially charged with 0.02 g of Desmorapid Z and 3.6 g of 2,4,4-trimethylhexane 1,6-diisocyanate (TMDI), and the mixture was heated to 60° C. Subsequently, 11.9 g of 2,2,3,3,4,4,5,5,6,6,7,7-dodecafluoroheptan-1-ol were added dropwise and the mixture was still kept at 60° C. until the isocyanate content had fallen below 0.1%. This was followed by cooling. The product was obtained as a colourless oil.

Borate (Photoinitiator):

The borate was prepared as described in Example 1 of European application EP 13189138.4. A 51.9% solution of benzyldimethylhexadecylammonium borate was obtained.

Dye 1:

The preparation of the dye is described in Example 9 of WO 2012 062655.

Dye 2:

The preparation of the dye is described in Example 15 of WO 2012 062655.

Dye 3:

The preparation of the dye is described in Example 14 of WO 2012 062655.

Substrate:

Tacphan 915-GL is a 50 m-thick triacetate foil from LOFO high Tech Film GMBH, DE-79576 Weil am Rhein (Germany).

Desmodur@ N 3900 product from Bayer MaterialScience AG, Leverkusen, DE, hexane diisocyanate-based polyisocyanate, proportion of iminooxadiazinedione at least 30%, NCO content: 23.5%.

Trimethylhexamethylene diisocyanate [28679-16-5]—ABCR GmbH & Co KG, Karlsruhe, Germany 1H,1H-7H-Perfluoroheptan-1-ol [335-99-9]—ABCR GmbH & Co KG, Karlsruhe, Germany Desmorapid Z dibutyltin dilaurate [77-58-7], product from Bayer MaterialScience AG, Leverkusen, Germany.

Fomrez UL 28 Urethanization catalyst, commercial product of Momentive Performance Chemicals, Wilton, Conn., USA.

Sodium bis(2-ethylhexyl)sulphosuccinate [45297-26-5] is available from Aldrich Chemie, Steinheim.

4-Chlorophenylmagnesium bromide [873-77-8] is available as 0.9 M solution in THF/toluene from Aldrich Chemie, Steinheim.

Tetrabutylammonium bromide [1643-19-2] is available from ABCR GmbH & Co. KG, Karlsruhe.

BYK® 310 silicone-based surface additive from BYK-Chemie GmbH, Wesel, 25% solution in xylene Ethyl acetate [141-78-6] solvent Production and Characterization of Test Holograms Test holograms were prepared as follows: the photopolymer films were cut to the desired size in the dark and laminated with the aid of a rubber roller onto a glass plate of dimensions 50 mm×70 mm (thickness 3 mm).

The test holograms were produced by means of a test apparatus which produces Denisyuk reflection holograms by means of green (532 nm) laser radiation. The test apparatus consists of a laser source, an optical beam guide system and a holder for the glass coupons. The holder for the glass coupons is mounted at an angle of 13° relative to the beam axis.

The laser source generated the radiation, which was widened to about 5 cm by means of a specific optical beam path and conducted toward the glass coupon which was in optical contact with the mirror. The holographic object was a mirror of size about 2 cm×2 cm, such that the reconstruction of the hologram involved reconstruction of the wavefront of the mirror. All the examples were exposed with a green 532 nm laser (Newport Corp, Irvine, Calif., USA, cat. no. EXLSR-532-50-CDRH). By means of a shutter, the recording film was exposed in a defined manner for 2 seconds.

Subsequently, the samples were placed onto the conveyor belt of a UV source with the substrate side facing the lamp and exposed twice at a belt speed of 2.5 m/min. The UV source used was an iron-doped Hg lamp of the Fusion UV type "D Bulb" No. 558434 KR 85 with total power density 80 W/cm$^2$. The parameters corresponded to a dose of 2×2.0 J/cm$^2$ (measured with an ILT 490 Light Bug).

Because of the high efficiency of the volume hologram, this diffractive reflection can be analysed in transmission with visible light with a VIS spectrometer (USB 2000, Ocean Optics, Dunedin, Fla., USA), and it appears in the transmission spectrum as a peak with reduced transmission. The quality of the hologram can be ascertained via the evaluation of the transmission curve: The width of the peak was determined as the "full width at half maximum" (FWHM) in nanometres (nm), the depth of the peak (Tmin) was reported as 100%–Tmin in percent, and the region with the lowest transmission indicates the wavelength (nm) of highest diffraction efficiency.

EXAMPLES

Example 1

A test hologram made from holographic recording film was positioned and aligned in an orifice in a round plastic sleeve (see also FIG. 4g). First of all, the casting mould was mounted by clipping two glass lenses (diameter 85 mm, internal radius 88 mm, Shamir Insight, Inc.) onto the plastic sleeve, so as to form a moulding cavity.

The casting system consisted of a mixture 1: 80 g of Desmodur I (isophorone diisocyanate, Bayer Materialscience AG, Leverkusen, Germany), 20 g of Desmodur N 3200 (a biuret containing polyisocyanate of hexamethylene diisocyanate, Bayer Materialscience AG, Leverkusen, Germany) and 3.76 g of Zelec UN mould release agent (Stepan Company, USA), which was mixed and left to stand overnight. Mixture 2 was mixed together from 73.9 g of Desmophen 4011 T (Bayer Materialscience AG, Leverkusen, Germany) and 0.04 g of catalyst (4,12-dibutyl-2,6,10,14-tetramethyl-1,7,9,15-tetraoxa-4,12-diaza-8-stannaspirol [7.7]pentadecane) and likewise left to stand overnight. Thereafter, mixture 1 was transferred into a flask and evacuated at 10 mbar for 10 minutes. Mixture 2 was then added to the flask, and the final mixture 3 was stirred again and degassed. Mixture 3 was then filtered through a 5 µm filter and introduced into a syringe, and then the casting mould was filled completely.

The filled casting mould was dried in a drying cabinet with the following temperature profile: at 20° C. for 4 hours; linear heating to 100° C. within a period of 13 hours; constant temperature of 100° C. for 2 hours; constant temperature of 120° C. for 2 hours. Finally, the casting mould was cooled to room temperature and, after it had cooled down completely, first the sleeve and then the two glass bodies were removed manually.

Example 2

Example 2 was produced and characterized just like Example 1, except that the casting system did not contain any catalyst.

Example 3

Example 3 was produced and characterized just like Example 1, except that the casting system contained 0.04 g of the catalyst 2,4,6,10,12,14-hexamethyl-1,7,9,15-tetraoxa-4,12-diaza-8-stannaspiro[7.7]pentadecane.

Example 4

Example 4 was produced and characterized just like Example 1, except that the test hologram was positioned and bonded at the edges of the concave side of the surface of the glass mould (see also FIG. 3).

Table 1 shows the spectral properties of the embedded holograms before and after encapsulation in each case.

TABLE 1

Central wavelength of the Denisyuk holograms reported before and after encapsulation.

| | Central wavelength [nm] |
|---|---|
| Example 1 - before embedding | 530 |
| Example 1 - in cured glass lens | 566 |
| Example 2 - before embedding | 529 |
| Example 2 - in cured glass lens | 563 |
| Example 3 - before embedding | 531 |
| Example 3 - in cured glass lens | 550 |
| Example 4 - before embedding | 530 |
| Example 4 - in cured glass lens | 539 |

The invention claimed is:

1. A process for producing an optical casting for holographic electronic displays, automotive head-up displays or head-mounted displays, comprising at least one volume-holographic optical element by means of at least one casting operation using a casting material, the process comprising the following steps:
providing a casting mould comprising a first mould section having a flat, spherical, aspherical or free-form first surface and a second mould section having a flat, spherical, aspherical or free-form second surface, the first mould section being connectable to the second mould section to form the casting mould,
providing at least one laminar holographic optical element having a first surface and a second surface and a narrow edge surface combining the first and the second surface,
positioning and aligning the at least one holographic optical element with respect to the first mould section or/and with respect to the second mould section wherein the holographic optical element is completely or almost completely embedded in the casting material after introduction of the casting material,
combining the first and second mould sections to form the casting mould,
introducing the casting material in one or more casting steps, the casting material having a maximum viscosity at 25° C. of 100 000 mPas wherein the casting material completely or almost completely contacts the first and the second surface of the holographic optical element,
curing the casting material,
removing the cured casting material comprising the at least one holographic optical element from the casting mould, the at least one holographic optical element being at least partly surrounded by the casting material.

2. The process according to claim 1,
wherein
the first and/or second mould section comprises at least one sleeve for connection of one mould section to the other mould section.

3. The process according to claim 2,
wherein
the at least one holographic optical element is positioned and aligned exclusively or additionally with respect to the at least one sleeve.

4. The process according to claim 1,
wherein
the at least one holographic optical element is positioned and aligned with respect to the first surface of the first mould section and/or with respect to the second surface of the second mould section.

5. The process according to claim 4,
wherein
the at least one holographic optical element is positioned and aligned with respect to the first surface of the first mould section and/or with respect to the second surface of the second mould section by means of a material droplet which functions as fixing agent, the refractive index of the material droplet differing from that of the casting material by not more than 0.01, preferably 0.002.

6. The process according to claim 1,
wherein
the at least one holographic optical element is positioned and aligned on at least one film section, the at least one film section being disposed on the first surface of the first mould section and/or on the second surface of the second mould section and covering at least sections thereof.

7. The process according to claim 1,
wherein
the at least one holographic optical element is connected at least in sections to a film section, the film section additionally providing a further optical function.

8. The process according to claim 1,
wherein the first and/or second mould section is at least partly filled with casting material and the casting material is at least partly cured, and then the at least one holographic optical element is positioned and aligned on the formed surface of the at least partly cured casting material, and then the first and second mould sections are combined to form the casting mould, then the casting mould is completely filled with casting material and the entire casting material is subsequently cured.

9. The process according to claim 1, wherein
the at least one holographic element is flat and is aligned and positioned with its surface normal at an angle to the optical axis of the casting of 0° to 90°.

10. The process according to claim 1, wherein
the at least one holographic optical element is integrated into an optical layer structure,
the layer structure being configured such that light can be input into the layer structure, can propagate along the extent of the layers of the layer structure, can be emitted via the at least one holographic optical element in the surrounding optical casting and thence can leave the optical casting.

11. The process according to claim 1, wherein
the at least one holographic optical element is formed by a photopolymer material, the photopolymer material comprising a binder, at least one writing monomer and at least one photoinitiator system.

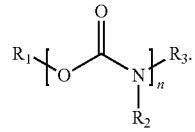

(II)

12. The process according to claim 1, wherein
the casting material on introduction has a viscosity of less than 5000 mPas at 25° C.

13. The process according to claim 1, wherein
the casting material comprises one or more monomers and/or oligomers having at least one functional group, the at least one functional group being selected from: acryloyl, methacryloyl, vinyl, allyl, isocyanate, isothiocyanate, alcohol, acid, oxirane, thiirane, thiol and amine.

* * * * *